(12) United States Patent
Liu et al.

(10) Patent No.: US 8,855,699 B2
(45) Date of Patent: Oct. 7, 2014

(54) METHOD AND ARRANGEMENT FOR DETERMINING A MINIMUM TRANSMIT POWER GAIN FACTOR FOR AN ENHANCED UPLINK DATA COMMUNICATION

(75) Inventors: Jinhua Liu, Beijing (CN); Xinyu Gu, Beijing (CN)

(73) Assignee: Telfonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 13/061,848

(22) PCT Filed: Jun. 5, 2009

(86) PCT No.: PCT/SE2009/050674
§ 371 (c)(1),
(2), (4) Date: Mar. 2, 2011

(87) PCT Pub. No.: WO2010/033066
PCT Pub. Date: Mar. 25, 2010

(65) Prior Publication Data
US 2011/0171991 A1    Jul. 14, 2011

Related U.S. Application Data

(60) Provisional application No. 61/098,066, filed on Sep. 18, 2008.

(51) Int. Cl.
| | |
|---|---|
| H04B 1/00 | (2006.01) |
| H04B 7/00 | (2006.01) |
| H04B 1/04 | (2006.01) |
| H04W 52/16 | (2009.01) |
| H04W 52/14 | (2009.01) |
| H04W 52/28 | (2009.01) |
| H04W 52/48 | (2009.01) |
| H04W 52/36 | (2009.01) |

(52) U.S. Cl.
CPC ............ *H04W 52/146* (2013.01); *H04W 52/48* (2013.01); *H04W 52/16* (2013.01); *H04W 52/367* (2013.01); *H04W 52/286* (2013.01)
USPC ........................... 455/522; 455/69; 455/127.1

(58) Field of Classification Search
CPC .................................................... H04W 52/367
USPC .......................................... 455/522, 69, 450
See application file for complete search history.

(56) References Cited

U.S. PATENT DOCUMENTS 7,050,405 B2 *  5/2006  Attar et al. ................... 370/282
7,336,937 B2 *  2/2008  Tervaluoto et al. ........ 455/232.1

(Continued)

FOREIGN PATENT DOCUMENTS

| CN | 1829111 A | 9/2005 |
| CN | 1716837 A | 1/2006 |

(Continued)

OTHER PUBLICATIONS

Ericsson: "Improved EUL power control at UE power limitation", 3GPP Draft, Agenda Item No. 5, (Aug. 12, 2008), pp. 1-6.
"Universal Mobile Telecommunications System (UMTS); Physical layer procedures (FDD) (3GPP TS 25.214 version 8.3.0 Release 8); ETSI TS 125 214", ETSI Standard, [Online] No. V8.3.0, (Sep. 1, 2008), pp. 1-89.

(Continued)

*Primary Examiner* — Tilahun B Gesesse
(74) *Attorney, Agent, or Firm* — Nixon & Vanderhye P.C.

(57) ABSTRACT

A minimum value or range for a transmit power gain factor is determined that controls the transmit power level over an enhanced uplink data channel relative so as to ensure delivery of a minimum data service requirement over the enhanced uplink data channel. The minimum value or range for the enhanced uplink data channel power gain factor may be determined based on a selected enhanced uplink transmission format and/or a maximum number of allowable transmission attempts over the enhanced uplink data channel for a communications session so that the required Quality of Service (QoS) for the communications session can be fulfilled and an expected uplink coverage gain can be reached. The minimum value or range for the enhanced uplink data channel power gain factor is also compatible with other techniques to increase enhanced uplink coverage such as autonomous retransmission and improved L2 techniques.

22 Claims, 8 Drawing Sheets

(56) References Cited

U.S. PATENT DOCUMENTS

| | | | |
|---|---|---|---|
| 7,447,516 B2 * | 11/2008 | Heo et al. | 455/522 |
| 7,912,031 B2 * | 3/2011 | Kwak et al. | 370/342 |
| 8,179,836 B2 * | 5/2012 | Terry et al. | 370/328 |
| 8,700,084 B2 * | 4/2014 | Pelletier et al. | 455/522 |
| 2006/0003787 A1 * | 1/2006 | Heo et al. | 455/522 |
| 2007/0091852 A1 * | 4/2007 | Malladi et al. | 370/332 |
| 2008/0159184 A1 | 7/2008 | Niwano | |

FOREIGN PATENT DOCUMENTS

| | | |
|---|---|---|
| EP | 1699144 A2 | 9/2006 |
| WO | WO2007/043098 A1 | 4/2007 |

OTHER PUBLICATIONS

English Translation of First Office Action issued Mar. 28, 2013 in Chinese application No. 200980136829.1.

Taiwanese Office Action mailed Mar. 24, 2014 in Taiwanese Application No. 098122128.

3GPP TS 25.214 V6.11.0 (Dec. 2006); $3^{rd}$ Generation Partnership Project; Technical Specification Group Radio Access Network; Physical Layer Procedures (FDD) (Release 6); 60 pages.

3GPP TS 25.321 V6.15.0 (Mar. 2008); $3^{rd}$ Generation Partnership Project; Technical Specification Group Radio Access Network; Medium Access Control (MAC) Protocol Specification (Release 6); 94 pages.

* cited by examiner

METHOD AND ARRANGEMENT FOR DETERMINING A MINIMUM TRANSMIT POWER GAIN FACTOR FOR AN ENHANCED UPLINK DATA COMMUNICATION

This application is the U.S. national phase of International Application No. PCT/SE2009/050674, filed 5 Jun. 2009, which designated the U.S. and claims the benefit of U.S. Provisional Application No. 61/098,066, filed 18 Sep. 2008, the entire contents of each of which are hereby incorporated by reference.

TECHNICAL FIELD

The technical field relates to radio telecommunications, and particularly, to determining proper power levels for enhanced uplink data transmissions in a cellular communications system.

BACKGROUND

Wireless communication systems following Universal Mobile Telecommunications Systems (UMTS) technology, were developed as part of Third Generation (3G) Radio Systems, and is maintained by the Third Generation Partnership Project (3GPP). A mobile radio communication system, such as a UMTS type system, includes a mobile radio communication network communicating with mobile terminals or UEs (User Equipments) and with external networks. The UMTS network architecture includes a Core Network (CN) interconnected with a UMTS Terrestrial Radio Access Network (UTRAN) via an Iu interface. The UTRAN is configured to provide wireless telecommunication services to users through mobile radio terminals, referred to as user equipments (UEs) in the 3GPP standard, via a Uu radio interface. A commonly employed air interface defined in the UMTS standard is wideband code division multiple access (W-CDMA). The UTRAN has one or more radio network controllers (RNCs) and base stations, referred to as Node Bs by 3GPP, which collectively provide for the geographic coverage for wireless communications with UEs. Uplink (UL) communications refer to transmissions from UE to Node B, and downlink (DL) communications refer to transmissions from Node B to UE. One or more Node Bs are connected to each RNC via an Iub interface; RNCs within a UTRAN communicate via an Iur interface.

Mobile networks with High Speed Packet Access (HSPA) include High Speed Downlink Packet Access (HSDPA) and High Speed Uplink Packet Access (HSUPA) or Enhanced Uplink (EUL). The physical channels of the older Release 99 (R99) and newer EUL are shown in FIG. 1 on the right and left sides, respectively. Enhanced Uplink (EUL) introduces two new code-multiplexed uplink physical channels compared to R99. One is an enhanced data channel, E-DCH Dedicated Physical Data Channel (E-DPDCH), and the other is an enhanced control channel, E-DCH Dedicated Physical Control Channel (E-DPCCH). In EUL, the Dedicated Physical Control Channel (DPCCH) is used in the similar way as in R99 carrying pilot, power control, and Inner Loop Power Control (ILPC) information. The transport format of EUL is designated as E-DCH Transport Format Combination (E-TFC). A standard E-TFC table is set forth in 3GPP specification 25.321. In the E-TFC table, a transmit power gain factor named $\beta_{ed}$ is used to indicate the enhanced data channel E-DPDCH amplitude for each E-TFC in the table, and a transmit power gain factor named $\beta_{ec}$ is used to indicate the amplitude of E-DPCCH. In this table, the $\beta_{ec}$ value is fixed for all E-TFCs, and the $\beta_{ed}$ value is unique for each E-TFC value. In R99, the transmit power level of the DPDCH is indicated by $\beta_d$ for each transport format respectively. In both EUL and R99, the same parameter, $\beta_c$, is used to indicate the DPCCH transmit power level. The power offsets for data and other control channels relative to the allowed DPCCH transmit power level can be calculated and are shown in FIG. 1 for both EUL and R99 systems, where N is the number of E-DPDCHs or DPDCHs. A predetermined small minimum transmit power level of E-DPDCH is specified using $\beta_{ed, min}$ in 3GPP specification 25.214 (R6), and the minimum data power offset based on $\beta_{ed, min}$ is also shown in FIG. 1. In the uplink, DPCCH is used as a power reference with the power offset of all the other physical channels being defined relative to the DPCCH power.

EUL increases the uplink data rate and capacity compared to that in R99. In addition, the transmission time interval (TTI) length in EUL Release 6 (R6) is expanded to include a 2 ms TTI in addition to a 10 ms TTI. The introduction of the shorter 2 ms TTI in EUL unfortunately increases the risk of unduly limiting the UE transmission power on the uplink data channel E-DPDCH. For instance, a UE needs about 7 dB higher transmit power to send a voice packet over a 2 ms TTI as compared to sending it over a 10 ms TTI so that the packet is received with the same quality at the receiver side for a single transmission attempt. Since the use of multiple transmission attempts may not always be feasible or desirable, the coverage aspect of EUL systems with 2 ms TTIs should be addressed. The uplink coverage includes for example an area where a desired the Quality of Service (QoS) for an uplink radio transmission from a UE in that area to the network for a predetermined traffic load can be provided.

The R6 EUL specification stipulates that when the UE is "power-limited," i.e., the required total uplink transmit power for a UE's desired uplink communication exceeds the UE's maximum transmit power, the power level for the uplink transmission on the E-DPDCH is scaled down to a small predetermined minimum E-DCH power ratio. In contrast, the DPCCH is not scaled down in order to protect the DPCCH quality. This reduction of the E-DPDCH power level leads to an increase of transmission failures which then triggers the outer loop power control (OLPC) functionality to increase the DPCCH signal-to-interference (SIR) target used in the OLPC, leaving even less power for the E-DCH data channel. Another important issue is that the anti-windup mechanism of the Outer Loop Power Control (OLPC) will not prevent the SIR target increase. Although anti-windup prevents further increase of the DPCCH SIR target value if the current received DPCCH SIR can not reach the stipulated DPCCH SIR target, with the power scaling strategy in 3GPP release R6, the DPCCH SIR can still reach the SIR target even in a serious power limitation situation by scaling down E-DCH power. As a result, in the process of limiting uplink data channel power in release R6, the SIR target rapidly reaches the maximum SIR target limit.

So in summary, the justification for down-scaling the data channel power level to a very low predefined power offset in R6 was to protect the DPCCH. But this protection mechanism can produce too high of a DPCCH SIR and too low of a available E-DCH power. Ultimately, this low available E-DCH power results in small EUL coverage. One way to address this is problem is to use a configurable transmit power gain factor $\beta_{ed, min}$, which can avoid excessive down-scaling of the data channel E-DCH power by setting a minimum power level for the E-DCH. The configurable $\beta_{ed, min}$ permits a better trade-off of the power allocation between the E-DCH and the DPCCH control channel during UE power limitation, which in turn improves the EUL coverage by 4-5 dB. FIG. 2 illustrates that more power is allocated for E-DCH during power limitation with a configurable $\beta_{ed,\ min}$ compared to E-DCH power down-scaling in 3GPP R6.

Two other methods which could be used to overcome the UE power limitation problems and improve EUL coverage include autonomous retransmission and "improved layer 2" (L2). Autonomous retransmission is also called TTI bundling, which means that UE autonomously transmits one packet multiple times in consecutive TTIs according to the UE power limitation level in order to achieve a desired E-DCH reliability over a large coverage area than would be possible without such autonomous retransmission. Improved L2 also improves EUL coverage by separating data into various smaller media access control (MAC) packet data units (PDUs) so that smaller E-TFCs can be used during UE power limitation. For instance, a Voice over IP (VoIP) user generates a voice packet every 20 ms. Smaller packets can achieve more transmit power per bit during UE power limitation, thereby improving the VoIP quality for this UE.

Given that a configurable $\beta_{ed,\ min}$, which determines the lower E-DPDCH transmit power level, is going to be accepted in 3GPP R8, an important issue is how to determine the proper $\beta_{ed,\ min}$ value and/or range in order to achieve as large coverage gain. The proper $\beta_{ed,\ min}$ value and/or range assures that the Block Error Probability (BLEP) for the E-DCH after a maximum allowable number of transmission attempts by the UE on the E-DCH achieves the minimum service quality requirement for a desired uplink coverage area. The proper $\beta_{ed,\ min}$ value and/or range should also be compatible with other techniques to improve EUL coverage such as autonomous retransmission and improved L2.

SUMMARY

A method and arrangement are provided for determining a minimum value or range for a transmit power gain factor that is used in controlling the transmit power level for an enhanced uplink data channel relative to the transmit power for an uplink control channel so as to ensure delivery of a minimum data service requirement over the enhanced uplink data channel. The proper determination of the minimum value of power gain factor is particularly important in situations where the UE's uplink transmission power is limited. The minimum value or range for the enhanced uplink data channel power gain factor may be determined based on a selected enhanced uplink transmission format and/or a maximum number of allowable transmission attempts over the enhanced uplink data channel for a communications session so that the required Quality of Service (QoS) for the communications session can be fulfilled and an expected uplink coverage gain can be reached.

The determined transmit power gain factor minimum value is associated with an expected uplink coverage gain. The minimum value or range for the enhanced uplink data channel transmit power gain factor is also compatible with other techniques to increase enhanced uplink coverage such as autonomous retransmission and improved L2 techniques.

In one non-limiting example embodiment, the determined transmit power gain factor minimum value is determined based on a selected enhanced uplink transmission format and a maximum number of allowable transmission attempts over the enhanced uplink data channel for a communications session. The determined transmit power gain factor minimum value is determined using a power scaling safety offset having a value between one and the maximum number of allowable transmission attempts. A value of the power scaling safety offset depends on a quality of service associated with the enhanced uplink data channel for a communications session.

In another non-limiting example embodiment, the determined transmit power gain factor minimum value is determined based on a selected enhanced uplink transmission format. In yet another non-limiting example embodiment, the determined transmit power gain factor minimum value is determined based on a maximum number of allowable transmission attempts over the enhanced uplink data channel for a communications session.

The method and arrangement may be implemented in a radio network controller in the radio network, in a radio base station in the radio network, and/or in a mobile radio terminal. In the latter, the mobile radio terminal may receive at least one parameter from the radio access network used in the determining step.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes and functions described may be substantially represented in a computer-readable medium and can be executed by a computer or processor.

The functions of the various elements including control-related functional blocks may be provided through the use of electronic circuitry such as dedicated hardware as well as computer hardware capable of executing software. When provided by a computer processor, the functions may be provided by a single dedicated processor, by a single shared processor, or by a plurality of individual processors, some of which may be shared or distributed. Moreover, a processor or controller may include, without limitation, digital signal processor (DSP) hardware, ASIC hardware, read only memory (ROM), random access memory (RAM), and/or other storage media.

It will be apparent to one skilled in the art that other embodiments may be practiced apart from the specific details disclosed below. The technology is described in the context of a 3GPP UMTS system in order to provide an example and non-limiting context for explanation. But this technology may be used in any modern cellular communications system that can supports carrier reallocation.

Figure 1:
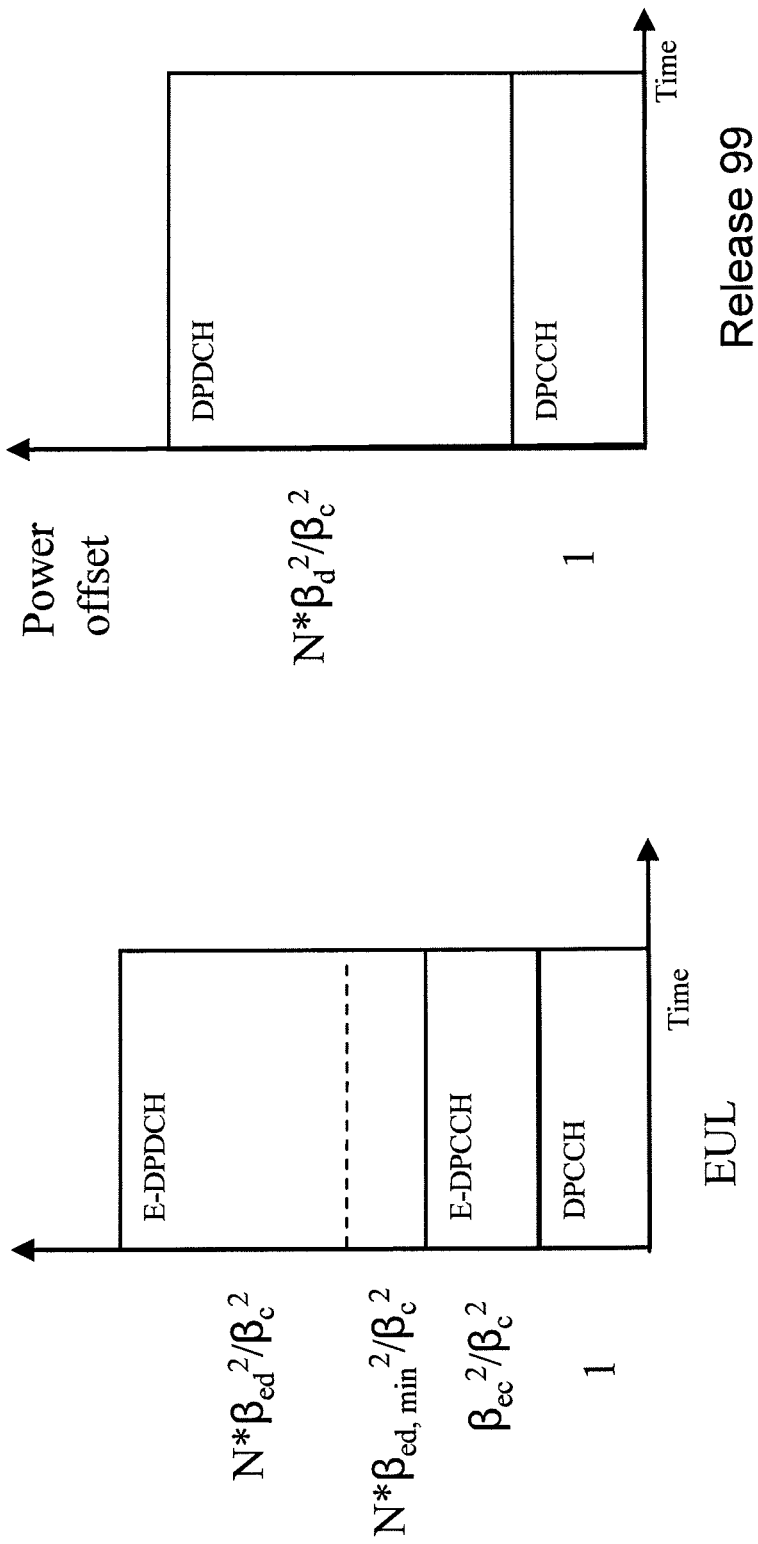
FIG. 1 is a diagram showing power allocation for physical control and data channels for EUL and R 99.
Figure 2:
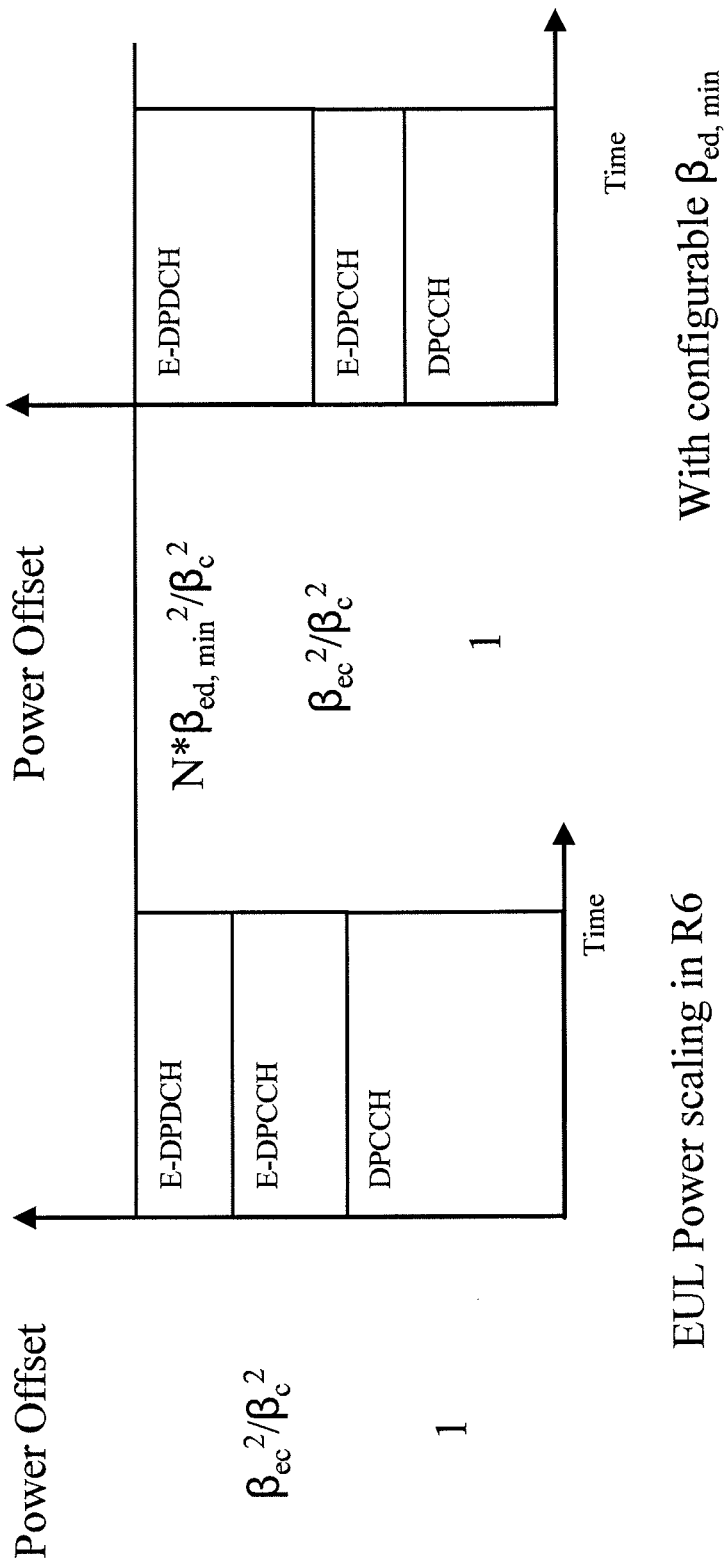
FIG. 2 is a diagram showing power allocation for physical control and data channels for EUL and R 99 during UE power limitation.
Figure 3:
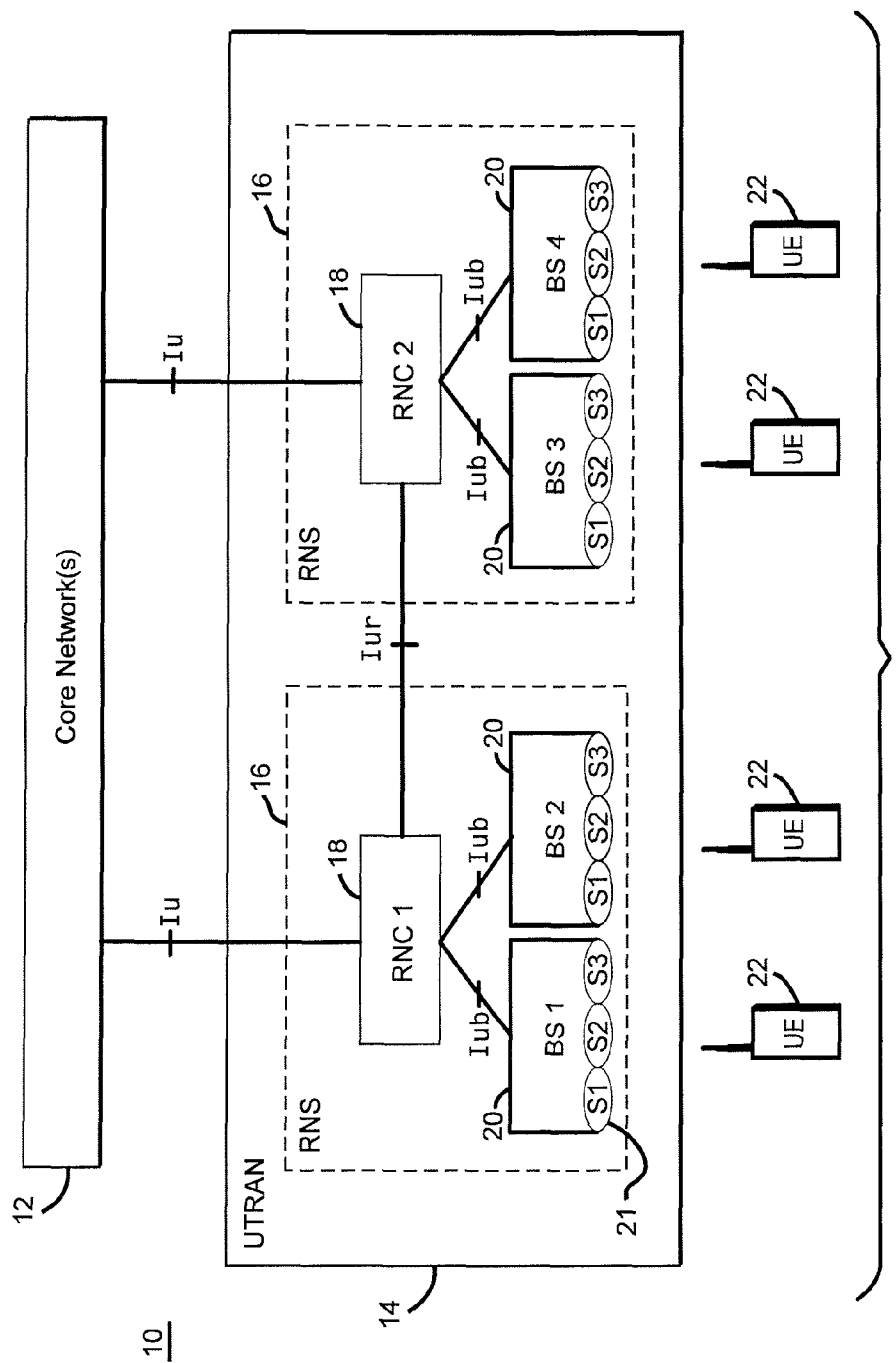
FIG. 3 a block diagram of an example UTRAN mobile radio communications system.

FIG. 3 illustrates a non-limiting example of a third generation, WCDMA-based, UMTS cellular radio communication system 10. The User Equipment (UE) 22 is the mobile radio terminal by which a user/subscriber can access services offered by the operator's Core Network(s) 12. Those networks are coupled to other networks such as the public switched telephone network (PSTN) and the Internet (not shown). The UMTS Terrestrial Radio Access Network (UTRAN) 14 is responsible for the establishment and control of radio connections with the mobile UEs. The Radio Network Subsystem (RNS) 16 controls a number of Base Stations (BSs) 20 in the UTRAN 14, with each base station being shown with three sector cells 21 (S1-S3) for illustration purposes. Each base station 20 coordinates radio communications in one or more cells. A cell covers a geographical area and is identified by a unique identity broadcast in the cell by its base station. There may be more than one cell covering the same geographical area, and in this case, two of the base station cells may be co-sited. Each Radio Network Controller (RNC) 18 controls radio resources and radio connectivity within a set of cells. A UE or mobile radio terminal connection logically represents the communication between a UE and one cell in the radio access network, and a radio link provides the actual physical radio connection between the UE and a base station associated with the cell.

FIG. 3 shows interfaces connecting the different nodes in the UTRAN 14. The Iu interface is defined between the core network 12 and the UTRAN 14. The Iur interface is defined for communications between RNCs 18. The Iub interface is defined for communications between the RNC 18 and its base stations 20. User data is transported on transport bearers over these interfaces. Depending on the transport network used, these transport bearers may be mapped to AAL2 connections (in case of an ATM-based transport network) or UDP connections (in case of an IP-based transport network).

Figure 4:
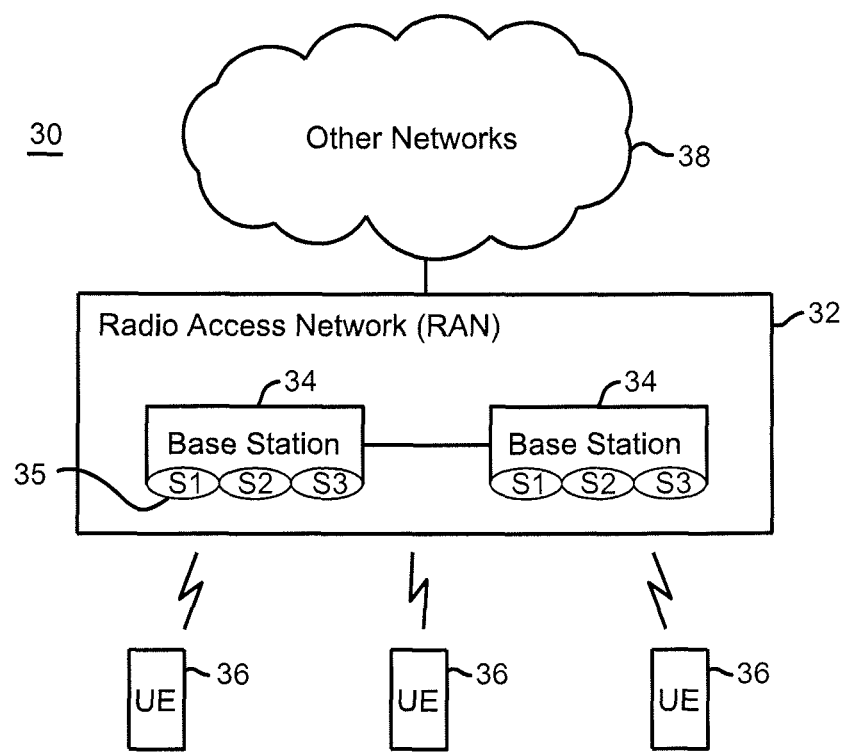
FIG. 4 a block diagram of an example LTE mobile radio communications system.

FIG. 4 illustrates a non-limiting example of an LTE mobile communication system 30. A radio access network (RAN) 32 is coupled to one or more other networks 38 such as one or more core network nodes and one or more external networks such as the public switched telephone network (PSTN) and the Internet. Each base station 34 is shown with three sector cells 35 (S1-S3) for illustration purposes. The RAN 32 includes base stations 34 that communicate with each other, e.g., for handover and other coordinated functions. The base stations communicate over the radio/air interface with mobile radio terminals also referred to as user equipment (UE) 36. At least some of the operations that would be performed in the RNC in the UMTS system 10 shown in FIG. 3 are performed in the base stations in the LTE system 30. As mentioned above, the examples below are described in the context of a 3G UMTS system like system 10 in FIG. 3.

An optimal or effective minimum value or range for a transmit power gain factor, referred to as $\beta_{ed,\ min}$, used in controlling the transmit power level for an enhanced uplink data channel relative to the transmit power for an uplink control channel, is determined so as to ensure delivery of a minimum data service requirement over the enhanced uplink data channel. The proper determination of $\beta_{ed,\ min}$ is particularly important in situations where the UE's uplink transmission power is limited. The minimum value or range for the enhanced uplink data channel power gain factor may be determined based on a selected enhanced uplink transmission format and/or a maximum number of allowable transmission attempts over the enhanced uplink data channel for a communications session so that the required Quality of Service (QoS) for the communications session can be fulfilled and an expected uplink coverage gain can be reached.

Determining an optimal or effective $\beta_{ed,\ min}$ value or range is important for achieving satisfactory uplink coverage. One way to measure the effectiveness of the calculated $\beta_{ed,\ min}$ value or range is to determine whether the Block Error Probability (BLEP) for the E-DCH after a maximum allowable number of transmission attempts by the UE on the E-DCH achieves a particular service quality requirement. The use of an effectively calculated $\beta_{ed,\ min}$ value or range is also compatible with other techniques for increasing enhanced uplink coverage such as autonomous retransmission and improved L2 techniques which were described in the background.

The $\beta_{ed,min}$ determination may be implemented in the UE, the base station Node B, and/or in an RNC. When the $\beta_{ed,min}$ calculation is implemented in the UE, the $\beta_{ed,min}$ calculation does not increase the signaling load between the UE and the radio network as would be the case if the base station/Node B or the RNC calculated $\beta_{ed,min}$ and then transmitted that value to the UE. An RNC or a base station can control the calculation of $\beta_{ed,min}$ regardless of where $\beta_{ed,min}$ is calculated, if desired, which means that the network can configure the $\beta_{ed,min}$ calculation according to a desired quality of service (QoS).

The following description corresponds to a first non-limiting example embodiment. One or both of the following factors can be used in the $\beta_{ed,\ min}$ calculation: (1) the selected E-TFC, and/or (2) the maximum number of allowable transmission attempts or of autonomous retransmissions in consecutive TTIs for the same data. In a first non-limiting example implementation for this first embodiment, the $\beta_{ed,\ min}$ calculation is based on both the selected E-TFC and the maximum allowable transmission attempts. An E-DCH power scaling safety offset (referred as $\Delta$) is used in this embodiment in calculating $\beta_{ed,\ min}$ in order to provide a margin of safety. That safety margin ensures that the minimum required QoS is achieved for the enhanced uplink data transmission while at the same time providing sufficient power to ensure reliable enhanced uplink control transmission. The $\beta_{ed,\ min}$ may be calculated according to the following equation:

$$\beta_{ed,min} = \beta_{ed} \sqrt{\frac{\Delta}{maxOrAutoTxAttempts}} \quad (1)$$

$$(maxOrAutoTxAttempts \geq \Delta \geq 1)$$

where $\Delta$ is a power scaling safety offset, $\beta_{ed}$ is the default $\beta_{ed}$ for a selected E-TFC, e.g., provided from an E-TFC table from the 3GPP specifications stored or provided to the calculating node where the UE selects the E-TFC and both the Node B and UE may store such E-TFC table. The E-TFC selected by the UE for an EUL transmission is used implicitly in equation (1) since $\beta_{ed}$ depends on E-TFC. The variable maxOrAutoTxAttempts is the maximum allowable transmission attempts when autonomous retransmission is not triggered. The maxOrAutoTxAttempts value may for example be determined and configured by the network which provides the maxOrAutoTxAttempts value to the entity calculating $\beta_{ed,min}$. When autonomous retransmission is triggered, maxOrAutoTxAttempts can be either the number of autonomous transmissions or maximum allowable transmission attempts.

The power scaling safety offset $\Delta$ protects against uncertainties and can be any integer or a real number between 1 and maxOrAutoTxAttempts. The power scaling safety offset $\Delta$ can for example be determined based on a minimum required QoS for a communications session. One example of an uncertainty is in the context of an outer loop power control (OLPC) scheme, where the block error rate (BLER) target is the BLER that can be reached at the target number of transmission attempts. Since the number of target transmission attempts is equal to the maximum number of transmission attempts, a safe margin should be considered. If the maximum number of transmission attempts is larger than or equal to the target number of transmission attempts in an OLPC scheme, then the BLER after the maximum transmission attempts has occurred should be lower or equal to the BLER target used in OLPC.

Another uncertainty example relates to determining $\beta_{ed}$. For each E-TFC, $\beta_{ed}$ is calculated by referring to the E-TFC associated with the UE's E-DCH transmission. Due to different code rates for different E-TFCs and the different coding gains for different code rates, calculating $\beta_{ed}$ by referring to E-TFCs can sometimes be inaccurate. In this case, a power scaling safety offset $\Delta$ value larger than 1 is desirable because it compensates for that inaccuracy.

The value of the power scaling safety offset $\Delta$ may also be selected to fulfill different QoS's. Different services have different minimum required QoS. For example, voice over IP (VoIP) requires higher QoS than best effort services. Therefore, a larger power scaling safety offset $\Delta$ is needed for VoIP as compared to that needed for best effort services. In one example implementation, the Node B may for example determine the power scaling safety offset $\Delta$ based on the effect of one or more of the aspects mentioned above.

The sum minimum E-DCH power offset is the sum of E-DCH data power offsets for the maximum transmission attempts, which can be calculated as follows:

$$sumMinEdchPowerOffset = maxOrAutoTxAttempts * \frac{\beta_{ed,min}^2}{\beta_c^2} \quad (2)$$

Substituting equation (1) into equation (2) produces:

$$sumMinEdchPowerOffset = \Delta \frac{\beta_{ed}^2}{\beta_c^2} \quad (3)$$

Equation 3 helps illustrate the meaning of $\Delta$ as a power scaling safety factor.

Figure 5:
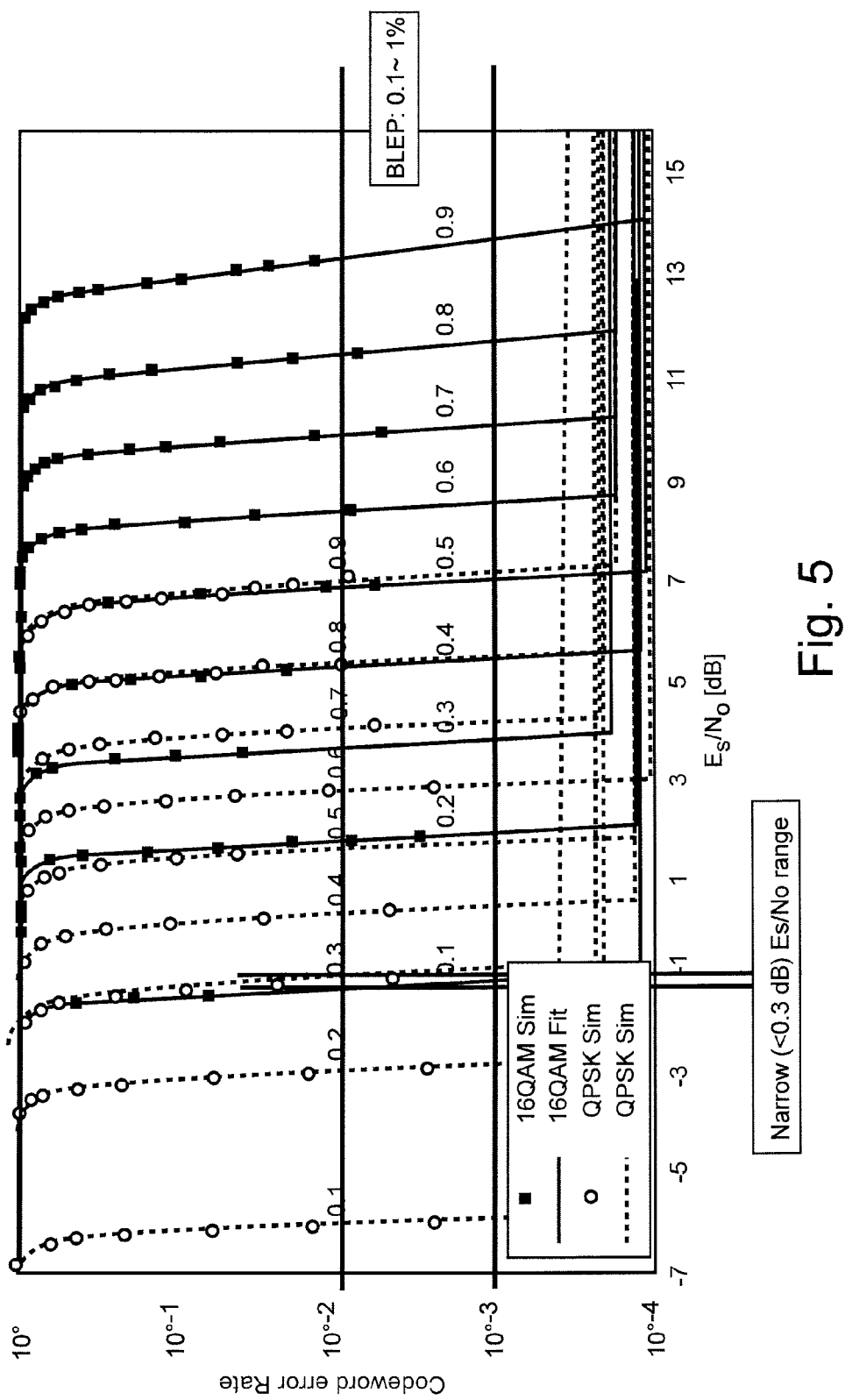
FIG. 5 is a graph of SNR vs. BLEP for UMTS turbo coding.

FIG. 5 shows link level simulation results of UMTS turbo coding performance. The x-axis indicates the received signal-to-noise power ratio and the y-axis indicates the BLEP of the received data block. Different curves illustrate the performance of different coding rates. From this figure, the required signal-to-noise power ratio to reach a certain BLEP can be identified. The slopes of BLEP vs. SNR curves are very steep, which means a power scaling safety offset range is very narrow and can be approximated and replaced by a single value. Furthermore, the slopes of the curves for different code rates (corresponding to different E-TFCs) are similar, which means that a common power scaling safety offset value may be used for different selected E-TFCs. This simplifies the determination of the power scaling safety offset value $\Delta$.

As mentioned earlier, from an implementation perspective, the optimal minimum transmit power gain factor $\beta_{ed,min}$ calculation can be performed in a radio network node like an RNC or a base station/Node B or in the UE. In a radio network node implementation, either the RNC or the base station calculates the proper $\beta_{ed,min}$, using equation (1), for the E-TFC that the UE will most frequently use during "UE power limitation." Both the Node B and the UE can identify the most frequently used E-TFC based on the RLC (Radio Link Control) PDU (Payload Data Unit) size configuration of the service type. This E-TFC may be within the minimum E-TFC set. The minimum E-TFC set includes E-TFCs equal to or smaller than the largest E-TFC configured by the network that the UE can select when the UE is in power limitation. The RNC or base station sends the calculated $\beta_{ed,min}$ for this E-TFC to the UE.

Figure 6A:
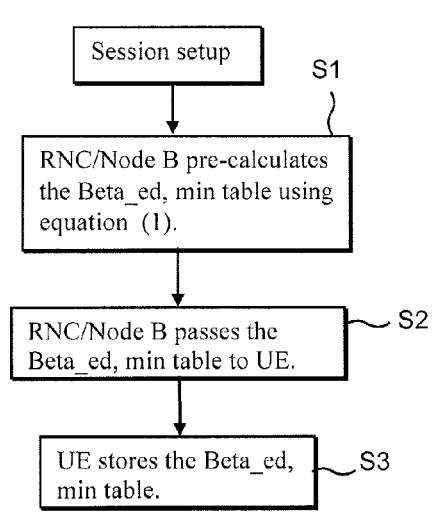
FIGS. 6A and 6B are non-limiting example flowcharts for an RNC/Node B-based implementation.
Figure 6B:
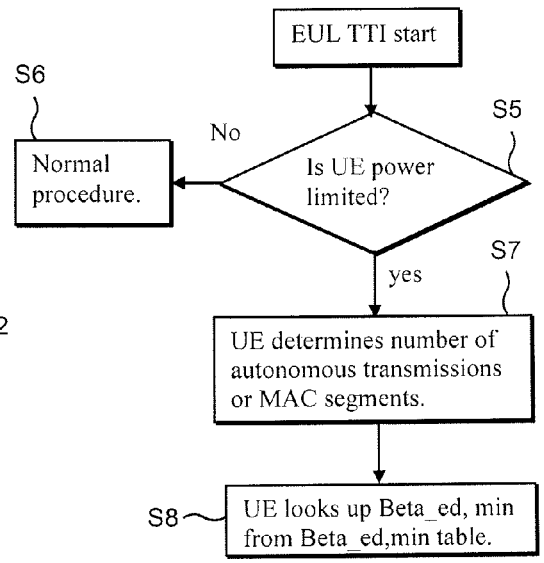

FIGS. 6A and 6B are non-limiting example flowcharts for an RNC/Node B-based implementation. FIG. 6A describes operations performed during set up of the communications session for the UE. In step S1, the RNC/Node B calculates a $\beta_{ed,min}$ table using equation (1) for different maximum numbers of hybrid-ARQ (HARQ) transmission attempts or autonomous transmission attempts and different E-TFCs within the minimum E-TFC set. The power scaling safety offset takes into consideration one or more of the factors mentioned above. The RNC/Node B may store the calculated $\beta_{ed,min}$ table in memory, if desired, but in any event passes the calculated $\beta_{ed,min}$ table information to the UE (step S2). The UE then stores the $\beta_{ed,min}$ table in memory (step S3). When a UE power limitation occurs, the UE can look up the $\beta_{ed,min}$ table according to the UE's selected E-TFC and the maximum number of HARQ transmission attempts or autonomous transmission attempts and then use that optimal calculated $\beta_{ed,min}$ for EUL data transmissions.

FIG. 6B describes procedures during enhanced uplink (EUL) transmission, where the UE transmits information to the radio network during scheduled transmission time intervals (TTIs). A decision is made in step S5 whether UE's transmit power is limited (for the reasons discussed earlier). If not, operations for transmission control proceed as normal (step S6). If the UE's transmit power is limited, then the UE determines the number of autonomous transmissions (or MAC segments if improved L2 is employed by the UE) (step S8). The UE then determines the E-TFC for the EUL transmission, and using the determined $\beta_{ed,min}$ from the E-TFC and from the number of autonomous transmissions or MAC segments as indices to $\beta_{ed,min}$ table stored in memory, the UE determines the $\beta_{ed,min}$ that should be applied for the uplink transmission by the UE over the E-DCH (step S8).

If frequent $\beta_{ed,min}$ adjusting is needed in order to achieve a desirable coverage gain, then signaling delay and signaling load could be an issue if the RNC or the base station perform the $\beta_{ed,min}$ calculation. For example, when there is autonomous retransmission in the case where an initial E-DCH transmission was corrupted, the number of autonomous transmission attempts could be adjusted frequently by UE based on the current available E-DCH power. Using a fixed $\beta_{ed,min}$ may mean a coverage loss since a fixed $\beta_{ed,min}$ may not be optimal for different numbers of autonomous transmission attempts. On the other hand, adjusting $\beta_{ed,min}$ at a high frequency means a high signaling load and signaling delay, which can also lead to coverage loss.

These signaling issues can be avoided in an example implementation where the UE determines the effective $\beta_{ed,min}(s)$. In this case, the RNC or base station signals the power scaling safety offset value $\Delta$ to the UE. The UE then calculates the effective or optimal $\beta_{ed,min}$ using equation (1). Although the power scaling safety offset value $\Delta$ needs to be signaled initially to the UE, signaling $\beta_{ed,min}$, or an adapted $\beta_{ed,min}$ to the UE once or multiple times is no longer necessary because the UE does the $\beta_{ed,min}$ calculation. Nevertheless, the RNC or base station can still exert some control over the UE's calculation of $\beta_{ed,min}$ via the signaled power scaling safety offset value $\Delta$. The signaling load and delay associated with the power scaling safety offset value $\Delta$ is not an issue since the probability of adjusting $\Delta$ during a session is very low. Because the UE can readily recalculate new values of $\beta_{ed,min}$ if needed for a change in conditions, the effective or optimal $\beta_{ed,min}$ is employed so that the desired uplink coverage gain can be achieved without increasing the radio network-UE signaling load.

Figure 7A:
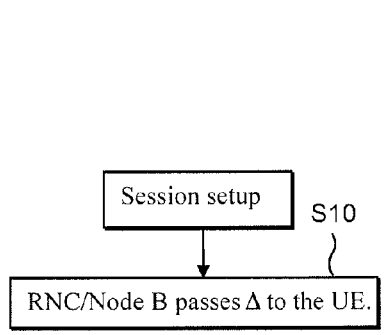
FIGS. 7A and 7B are non-limiting example flowcharts for a UE-based implementation.
Figure 7B:
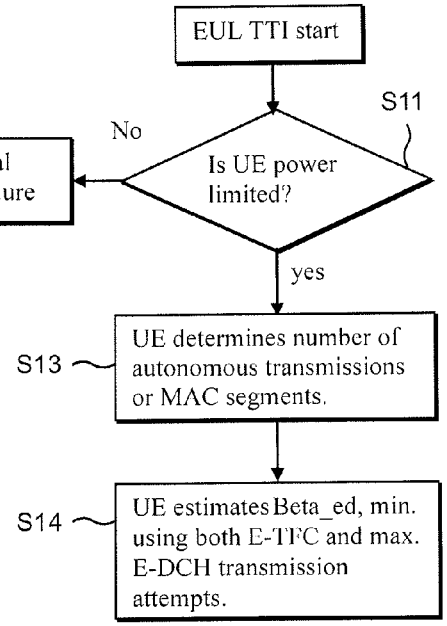

FIGS. 7A and 7B are non-limiting example flowcharts for a UE-based implementation. FIG. 7A describes an operation that occurs during set up of the communications session for the UE. In step S10, the RNC/Node B provides to the UE the power scaling safety offset value $\Delta$ to be used by the UE in calculating $\beta_{ed,min}$. FIG. 7B describes procedures during enhanced uplink (EUL) transmission, where the UE transmits information to the radio network during scheduled transmission time intervals (TTIs). A decision is made in step S11 whether UE's transmit power is limited (for the reasons discussed earlier). If not, operations for transmission control proceed as normal (step S12). If the UE's transmit power is limited, then the UE determines the number of autonomous transmissions or MAC segments (step S13). The UE then estimates the $\beta_{ed,min}$ that should be applied for the uplink transmission by the UE over the E-DCH using equation (1) using both the enhanced-transmission format combination (E-TFC) selected for this uplink transmission and a maximum number of E-DCH transmission attempts per communications session (step S8). The E-TFC selected by the UE for an EUL transmission is used implicitly in equation (1) since $\beta_{ed}$ depends on E-TFC.

Both the radio access network node and the UE calculation of $\beta_{ed,min}$ are compatible with both autonomous retransmission and improved L2.

In a second non-limiting example embodiment, the $\beta_{ed, min}$ calculation is based on the E-TFC for the E-DCH transmission without considering a maximum number of transmission attempts. When there is UE power limitation in effect, only small E-TFCs will be used since smaller E-TFCs correspond to lower data rates and thus lower transmit power. These small E-TFCs can probably use one reference E-TFC. This reference E-TFC can be determined according to a minimum required data rate over the air interference and/or a minimum RLC PDU size for the communications session. For example, for 12.2 kbps VoIP, a E-TFC of 307 bits can be used as a reference E-TFC in an EUL 2 msec TTI case. For the one reference E-TFC there is a corresponding default $\beta_{ed}$. From the one $\beta_{ed,min}$ calculated for the one reference E-TFC, the effective or optimal $\beta_{ed,min}$ is used for all small E-TFCs. The $\beta_{ed,min}$'s for other E-larger TFCs may for example be calculated in a similar way as $\beta_{ed}$ is calculated in the 3GPP specification 25.214 release 6. In 3GPP release 6, there are a set of reference E-TFCs whose $\beta_{ed}$ is signaled from Node B to UE. The $\beta_{ed}$ of other E-TFCs are calculated by referring to a closest reference E-TFC with the number of E-DPDCH channels and transport block size taken into account. Similarly, the $\beta_{ed,min}$ of all other small E-TFCs can be calculated by replacing the $\beta_{ed,ref}$ with $\beta_{ed,min, ref}$ or using equation (4) below:

$$\beta_{ed,min} = \frac{\beta_{ed}}{\beta_{ed,ref}} \beta_{ed,min,ref} \qquad (4)$$

where $\beta_{ed,ref}$ $\beta_{ed,min, ref}$ and are the $\beta_{ed}$ and $\beta_{ed,min}$ of the reference E-TFC respectively. $\beta_{ed}$ is the default $\beta_{ed}$ for the one reference E-TFC. This non-limiting example embodiment also works well when there is no autonomous retransmission. One instance is that various small E-TFCs can be used with improved L2 during UE power limitation. It is better to have the proper $\beta_{ed,min}$ (s) for these small E-TFCs in order to achieve better coverage gain. This method can be used to calculate the proper $\beta_{ed,min}(s)$ for these small E-TFCs.

As described for the first non-limiting example embodiment, the $\beta_{ed, min}$ calculation in this embodiment can be implemented in the UE, base station, or RNC (if present in the network). When implemented in the UE, the RNC/base station only needs to signal to the UE the value for $\beta_{ed,ref}$ according to the QoS of the traffic and/or RLC PDU sizes configured for this traffic, and the UE can then calculate $\beta_{ed,min}$ for different E-TFCs statically or dynamically using equation (4), where there is a corresponding default $\beta_{ed}$ for each different E-TFC. The UE knows the E-TFC and the corresponding default $\beta_{ed}$ from equation (4).

In a third non-limiting example embodiment, the $\beta_{ed, min}$ calculation is based on a maximum number of allowed transmission attempts or the number of automatic retransmissions in consecutive TTIs without considering the E-TFC for the E-DCH transmission. Using a reference $\beta_{ed,min,ref}$ associated with a predetermined number of transmission attempts for an $\beta_{ed,min}$ with a different number of transmission attempts for this E-TFC than the predetermined number can be calculated as in equation (5).

$$\beta_{ed,min} = \sqrt{\frac{nrofTxAttempts}{nrofTxAttempts_{ref}}} \beta_{ed,min,ref} \qquad (5)$$

where nrofTxAttempts$_{ref}$ and $\beta_{ed,min,ref}$ correspond to the number of transmission attempts and $\beta_{ed,min}$, respectively, for the reference E-TFC. The nrofTxAttempts is the desired number of autonomous retransmission attempts for this E-TFC based on the available E-DCH power for the current TTI or the maximum allowable transmission attempts.

This third example embodiment may be useful when one E-TFC is used at a very high frequency during a UE power limitation condition. For example, if improved L2 is not available, then the RLC PDU size for data is 320 bits, and the transport block size of minimum usable E-TFC for data transmission is 354, as specified in the 3GPP specification 25.321. Thus, there is only one E-TFC that the UE can use for data transmission during power limitation. In that case, this approach can work well with autonomous retransmission because the minimum usable E-TFC does not change, and thus, one $\beta_{ed,min,ref}$ is enough.

Figure 8A:
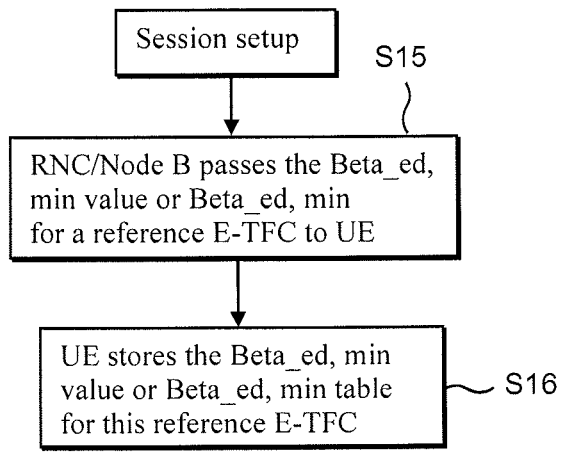
FIGS. 8A and 8B are non-limiting example flowcharts for other implementations using just E-TFC or just maximum E-DCH transmission attempts.
Figure 8B:
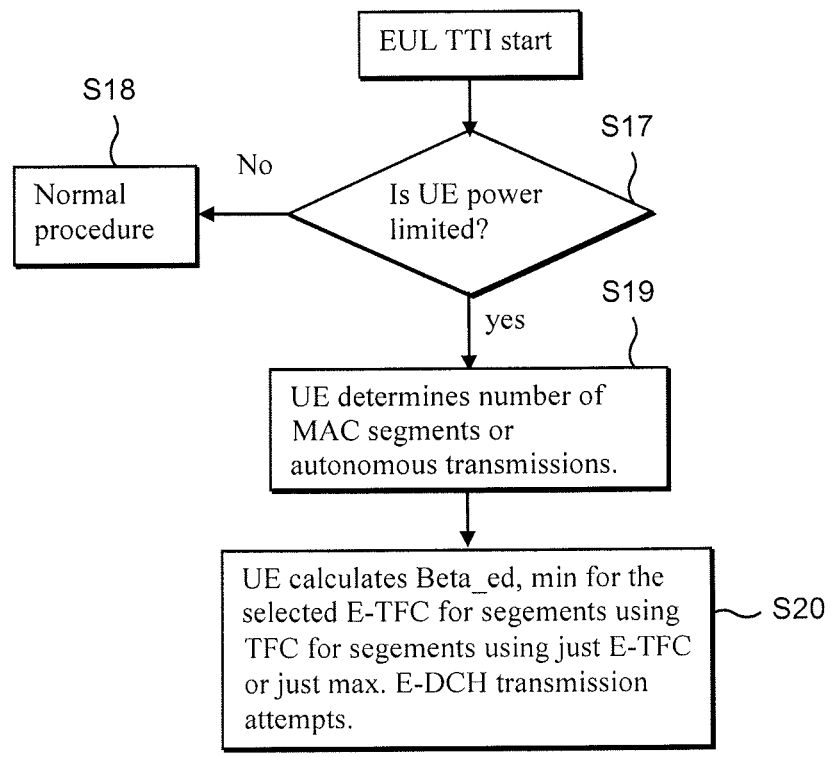

FIGS. 8A and 8B are non-limiting example flowcharts for other implementations using just one of E-TFC or maximum E-DCH transmission attempts without using the other. FIG. 8A describes operations that occur during set up of the communications session for the UE. In step S15, the RNC/Node B calculates a $\beta_{ed,min}$ table using equation (4) or (5) for different numbers of autonomous retransmissions or small E-TFCs. The RNC/Node B may store the table in memory, if desired, but in any event passes the table information to the UE. The UE can look up the proper $\beta_{ed,min}$ from the table using the selected E-TFC and/or the number of autonomous transmissions as an index/indices. The UE then stores the $\beta_{ed,min}$ table in memory (step S16). Alternatively, the RNC/Node B may calculate the effective or optimal $\beta_{ed,min}$ for a reference E-TFC to be used for this session and pass the calculated $\beta_{ed,min}$ to the UE.

FIG. 8B describes procedures during enhanced uplink (EUL) transmission, where the UE is transmitting information to the radio network during scheduled transmission time intervals (TTIs). A decision is made in step S17 whether UE's transmit power is limited (for the reasons discussed earlier). If not, operations for transmission control proceed as normal (step S18). If the UE's transmit power is limited, then the UE determines the number of autonomous transmissions or MAC segments assuming autonomous retransmission or improved Layer 2 is used during the UE power limitation (step S19). Using the determined number of autonomous transmissions or MAC segments as an index to the $\beta_{ed,min}$ table stored in memory, the UE determines the $\beta_{ed,min}$ that should be applied for the uplink transmission by the UE over the E-DCH for the selected E-TFC for each segment or transmission (step S20). The UE only uses one of the E-TFC or the determined number of autonomous transmissions or MAC segments.

Figure 9:
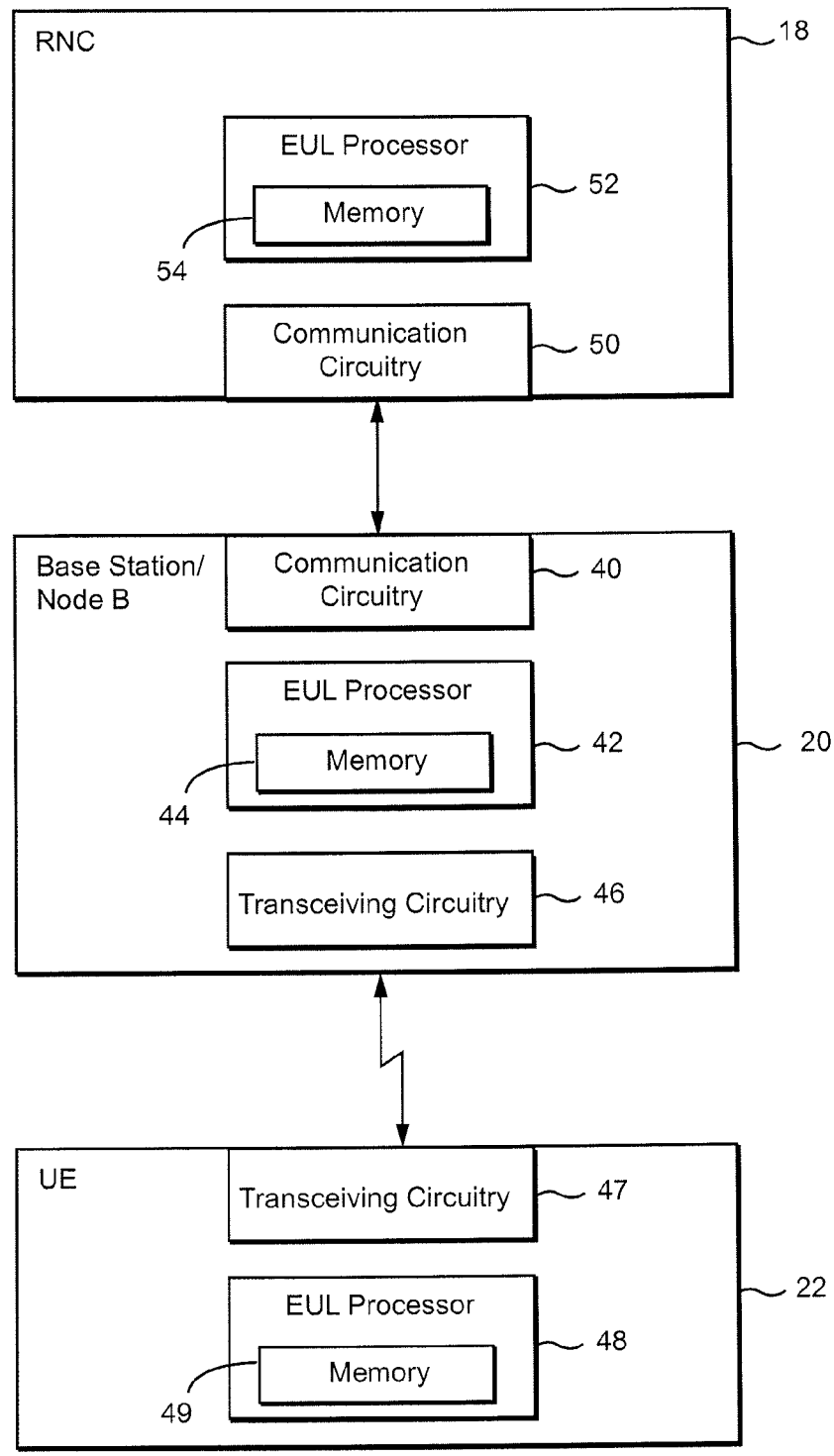
FIG. 9 is a non-limiting example function block diagrams of a RNC, Node B, and UE for implementing example embodiments.

FIG. 9 shows non-limiting example function block diagrams of an RNC, Node B, and UE for implementing example embodiments. The RNC 18 includes a computer-implemented functional entity called an EUL processor 52 that includes a memory 54 for storing one or more $\beta_{ed,min}$ tables generated by the EUL processor 52, E-TFC values, gain factor offset values, etc. Depending on the embodiment being implemented, the communications circuitry 50 is used to communicate information to the base station 20 needed by the UE for determining and/or using a proper $\beta_{ed,min}$ for the uplink E-DCH transmissions in the communication session. Each base station 20 includes communication circuitry 40 for communicating with communication circuitry 50 in the RNC 18. Although not shown, base stations may also communicate directly with each other without or independent of an RNC. The base station also includes radio transmission and reception circuitry 46 for conducting radio communications with the UE 22. Each base station 20 includes a EUL processor 42 that includes a memory 44 for storing one or more $\beta_{ed,min}$ tables generated by the EUL processor 42, E-TFC values, gain factor offset values, etc. Depending on the embodiment being implemented, the EUL processor is capable of communicating information to the base station 20 needed by the UE for determining and/or using a proper $\beta_{ed,min}$ for the uplink E-DCH transmissions in the communication session. The UE 22 includes radio transmission and reception circuitry 47 for conducting radio communications with the base station 20. The UE 22 includes a EUL processor 48 that includes a memory 49 for storing one or more $\beta_{ed,min}$ tables generated by the EUL processor 48 or the RNC/base station depending on the embodiment, E-TFC values, gain factor offset values, etc. Ultimately, the EUL processor 48 uses $\beta_{ed,min}$ to control the UE's allocation of transmit power for EUL transmissions during a UE power limited condition.

With the proposed method and arrangement, an optimal or effective $\beta_{ed,min}$ value that achieves a desired coverage gain may be calculated in different cases. The calculation for $\beta_{ed,min}$ may be flexibly implemented either in the UE, a base station, or an RNC. When the $\beta_{ed,min}$ calculation is implemented in the UE, the UE can adapt the $\beta_{ed,min}$ value based on the selected E-TFC and/or the number of autonomous retransmission attempts without increasing the signaling load. At the same time, the base station or RNC may still exert some control on the $\beta_{ed,min}$ determination, if desired. The proposed method and arrangement to calculate $\beta_{ed,min}$ also works well with other uplink coverage enhancement techniques such as autonomous retransmission and improved L2.

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method for use in a cellular radio communication system where a mobile radio terminal is configured to communicate with a radio access network by transmitting information using enhanced uplink radio channels, the method comprising:

determining a minimum value for a transmit power gain factor based on a maximum number of allowable transmission attempts over an enhanced uplink data channel for a communications session, and providing the determined transmit power gain factor minimum value for controlling a power level for a mobile radio terminal transmission on the enhanced uplink data channel relative to a transmit power for an uplink control channel transmission, wherein the determined transmit power gain factor minimum value is determined to ensure that a minimum data service requirement is provided over the enhanced uplink data channel, where in the determined transmit power gain factor minimum value is determined based on a selected enhanced uplink transmission format and the maximum number of allowable transmission attempts over the enhanced uplink data channel for a communications session, and wherein the determined transmit power gain factor minimum value is determined using a power scaling safety offset having a value between one and the maximum number of allowable transmission attempts.

2. The method in claim 1, wherein the determined transmit power gain factor minimum value is associated with an expected uplink coverage gain.

3. The method in claim 1, wherein a value of the power scaling safety offset depends on a quality of service associated with the enhanced uplink data channel for a communications session.

4. The method in claim 1, wherein the determined transmit power gain factor minimum value may be calculated according to the following equation:

$$\beta_{ed,min} = \beta_{ed}\sqrt{\frac{\Delta}{maxOrAutoTxAttempts}} \quad (maxOrAutoTxAttempts \geq \Delta \geq 1)$$

where $\beta_{ed,min}$ is the minimum transmit power gain factor, $\Delta$ is a power scaling safety offset, $\beta_{ed}$ is a default transmit power gain factor associated with the selected enhanced uplink transmission format, and maxOrAutoTxAttempts is the maximum allowable transmission attempts.

5. The method in claim 1, wherein the determined transmit power gain factor minimum value is determined based on a selected enhanced uplink transmission format.

6. The method in claim 5, wherein the determined transmit power gain factor minimum value is determined in accordance with the following:

$$\beta_{ed,min} = \frac{\beta_{ed}}{\beta_{ed,ref}}\beta_{ed,min,ref}$$

where $\beta_{ed,min}$ is the minimum transmit power gain factor for the selected enhanced uplink transmission format, $\beta_{ed,ref}$ and $\beta_{ed,min,ref}$ are a transmit power gain factor value and power gain factor minimum value respectively for a reference enhanced uplink transmission format, and $\beta_{ed}$ is a default $\beta_{ed}$ for the reference enhanced uplink transmission format.

7. The method in claim 1, wherein the determined transmit power gain factor minimum value is determined in accordance with the following:

$$\beta_{ed,min} = \sqrt{\frac{nrofTxAttempts}{nrofTxAttempts_{ref}}}\beta_{ed,min,ref}$$

where $\beta_{ed,min}$ is the minimum transmit power gain factor, $nrofTxAttempts_{ref}$ and $\beta_{ed,min,ref}$ correspond to the number of transmission attempts and the minimum transmit power gain factor, respectively, for a reference enhanced uplink transmission format, nrofTxAttempts is a desired number of autonomous retransmission attempts for the enhanced uplink transmission format based on an available enhanced data channel transmit power level for a current transmission or the maximum number of allowable transmission attempts.

8. The method of claim 1 implemented in a radio network controller in the radio network.

9. The method of claim 1 implemented in a radio base station in the radio network.

10. The method of claim 1 implemented in a mobile radio terminal.

11. The method of claim 10, wherein the mobile radio terminal receives at least one parameter from the radio access network used in the determining step.

12. Apparatus for use in a cellular radio communication system where a mobile radio terminal is configured to communicate with a radio access network by transmitting information using enhanced uplink radio channels, the apparatus comprising:

processing circuitry configured to determine a minimum value for a transmit power gain factor based on a maximum number of allowable transmission attempts over an enhanced uplink data channel for a communications session and to provide the determined transmit power gain factor minimum value for use in controlling a power level for a mobile radio terminal transmission on the enhanced uplink data channel relative to a transmit power for an uplink control channel transmission, wherein the processing circuitry is configured to determine the transmit power gain factor minimum value to ensure that a minimum data service requirement is provided over the enhanced uplink data channel, wherein the processing circuitry is configured to determine the transmit power gain factor minimum value based on a selected enhanced uplink transmission format and the maximum number of allowable transmission attempts over the enhanced uplink data channel for a communications session, and wherein the determined transmit power gain factor minimum value is determined using a power scaling offset having a value between one and the maximum number of allowable transmission attempts.

13. The apparatus in claim 12, wherein the determined transmit power gain factor minimum value is associated with an expected uplink coverage gain.

14. The apparatus in claim 12, wherein a value of the power scaling safety offset depends on a quality of service associated with the enhanced uplink data channel for a communications session.

15. The apparatus in claim 12, wherein the processing circuitry is configured to determine the transmit power gain factor minimum value according to the following equation:

$$\beta_{ed,min} = \beta_{ed}\sqrt{\frac{\Delta}{maxOrAutoTxAttempts}} \quad (maxOrAutoTxAttempts \geq \Delta \geq 1)$$

where $\beta_{ed,min}$ is the minimum transmit power gain factor, $\Delta$ is a power scaling safety offset, $\beta_{ed}$ is a default transmit power gain factor associated with the selected enhanced uplink transmission format, and maxOrAutoTxAttempts is the maximum allowable transmission attempts.

16. The apparatus in claim 12, wherein the determined transmit power gain factor minimum value is determined based on a selected enhanced uplink transmission format.

17. The apparatus in claim 16, wherein the processing circuitry is configured to determine the transmit power gain factor minimum value in accordance with the following:

$$\beta_{ed,min} = \frac{\beta_{ed}}{\beta_{ed,ref}}\beta_{ed,min,ref}$$

where $\beta_{ed,min}$ is the minimum transmit power gain factor for the selected enhanced uplink transmission format, $\beta_{ed,ref}$ and $\beta_{ed,min,ref}$ are a transmit power gain factor value and power gain factor minimum value respectively for a reference enhanced uplink transmission format, and $\beta_{ed}$ is a default $\beta_{ed}$ for the reference enhanced uplink transmission format.

18. The apparatus in claim 12, wherein the processing circuitry is configured to determine the transmit power gain factor minimum value in accordance with the following:

$$\beta_{ed,min} = \sqrt{\frac{nrofTxAttempts}{nrofTxAttempts_{ref}}} \beta_{ed,min,ref}$$

where $\beta_{ed,min}$ is the minimum transmit power gain factor, nrofTxAttemptsref and $\beta_{ed,min,ref}$ correspond to the number of transmission attempts and the minimum transmit power gain factor, respectively, for a reference enhanced uplink transmission format, nrofTxAttempts is a desired number of autonomous retransmission attempts for the enhanced uplink transmission format based on an available enhanced data channel transmit power level for a current transmission or the maximum number of allowable transmission attempts.

19. The apparatus of claim 12 implemented in a radio network controller in the radio network.

20. The apparatus of claim 12 implemented in a radio base station in the radio network.

21. The apparatus of claim 12 implemented in a mobile radio terminal.

22. The apparatus of claim 21, wherein the mobile radio terminal is configured to receive at least one parameter from the radio access network used in the determination.

* * * * *